(12) United States Patent
Lee

(10) Patent No.: US 7,118,505 B2
(45) Date of Patent: Oct. 10, 2006

(54) INTEGRALLY FORMED GEAR SET WITH A PLURALITY OF GEARS

(76) Inventor: Cheng Ming Lee, 235 Chung-Ho Box 8-24, Taipei (TW)

( * ) Notice: Subject to any disclaimer, the term of this patent is extended or adjusted under 35 U.S.C. 154(b) by 411 days.

(21) Appl. No.: 10/691,861

(22) Filed: Oct. 24, 2003

(65) Prior Publication Data

US 2005/0090349 A1  Apr. 28, 2005

(51) Int. Cl.
  *B62M 9/12*  (2006.01)
  *F16M 55/30*  (2006.01)
(52) U.S. Cl. .......................... 474/160; 474/78; 474/152
(58) Field of Classification Search ........ 474/152–156, 474/78, 160; 29/893.32, 893.33, 893.34; 74/445, 460
See application file for complete search history.

(56) References Cited

U.S. PATENT DOCUMENTS 4,324,323 A * 4/1982 Campagnolo ............... 474/160
4,380,445 A * 4/1983 Shimano ..................... 474/160
5,733,215 A * 3/1998 Hsu et al. ................... 474/160
6,428,437 B1 * 8/2002 Schlanger ................... 474/160

FOREIGN PATENT DOCUMENTS

| DE | (3810974 A1 * 12/1981 | ................. 474/160 |
| EP | (0047927 A2 *  3/1982 | ................. 280/238 |
| FR | (2610279 A3 *  8/1988 | ................. 474/78 |
| JP | (09-194775 A  *  7/1997 | |

* cited by examiner

Primary Examiner—Marcus Charles

(57) ABSTRACT

An integrally formed gear set with a plurality of gears comprises a first, a second and a third gear. Each gear has a plurality of teeth and a plurality of recess portions. The teeth and recess portions are alternatively arranged. The first, second and third gears are formed by a sheet which is firstly formed as a stepped structure containing three layers which are the first gear, second gear and third gears; the rings between two gears are formed with a plurality of teeth which are bent to be at the same plane of the second and third gears.

2 Claims, 5 Drawing Sheets

INTEGRALLY FORMED GEAR SET WITH A PLURALITY OF GEARS

FIELD OF THE INVENTION

The present invention relates to gear sets, and particular to an integrally formed gear set with a plurality of gears.

BACKGROUND OF THE INVENTION

The prior art gear sets are used in bicycle. FIGS. 1, 2, and 3 shows a prior art structure. The gear set 10 includes a first gear 11, a second gear 12, and a third gear 13. Each gear 11, 12 and 13 is punched with a plurality of teeth 24, a plurality of recess portions 25 and a plurality of rivet holes 16. Then sleeves 17 and rivets 18 serve to rivet the first, second and third gears 11, 12 and 13. The first gear 11 has a via hole 110 and the second gear 12 has an assembled hole 120 for assembling the treading sheet 19 of the pedal. The prior art has the following disadvantages. (1) Each gear is formed individually and then the sleeves 17 and rivets 18 are assembled. The assembled work is tedious and complicated so that the cost is high. The combination of sleeves 17 and rivets are loose so that after a long time, the gears will loose. The connection of rivets 18 are point connections so that the combination of gears is not firmly. Gaps are formed between gears so that a released chain will fall into the gap. All the actions are applied upon the teeth 14 and the concave portions 15. The gear is easily worn.

SUMMARY OF THE INVENTION

Accordingly, the primary object of the present invention is to provide an integrally formed gear set with a plurality of gears comprises a first, a second and a third gear. Each gear has a plurality of teeth and a plurality of recess portions. The teeth and recess portions are alternatively arranged. The first, second and third gears are formed by a sheet which is firstly formed as a stepped structure containing three layers which are the first gear, second gear and third gears. The rings between two gears are stripped with a plurality of teeth which are bent to be at the same plane of the second and third gears. The portions of the rings un-stripped are remained as concave portions.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
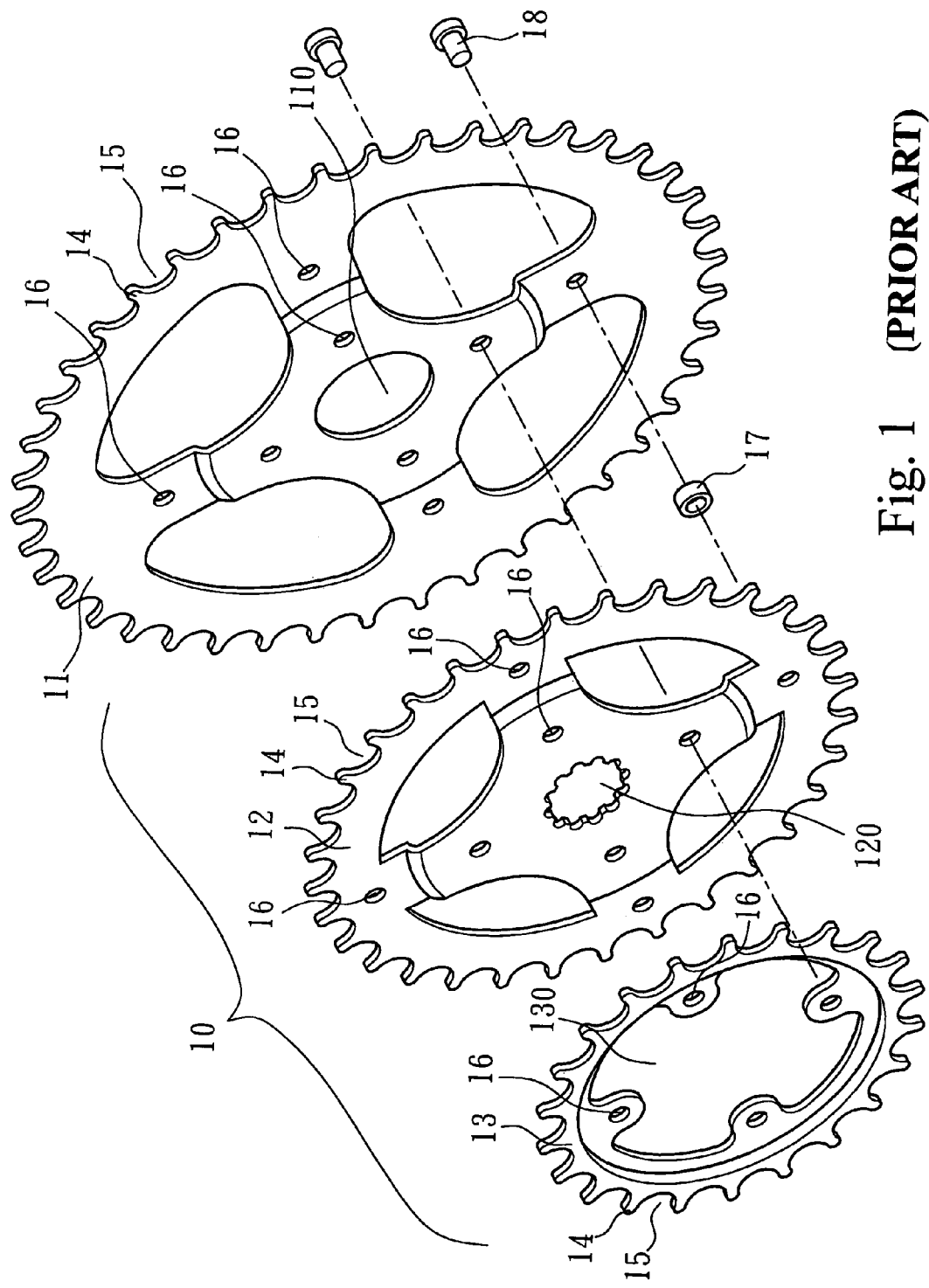
FIG. 1 is an exploded perspective view of the prior art.
Figure 2:
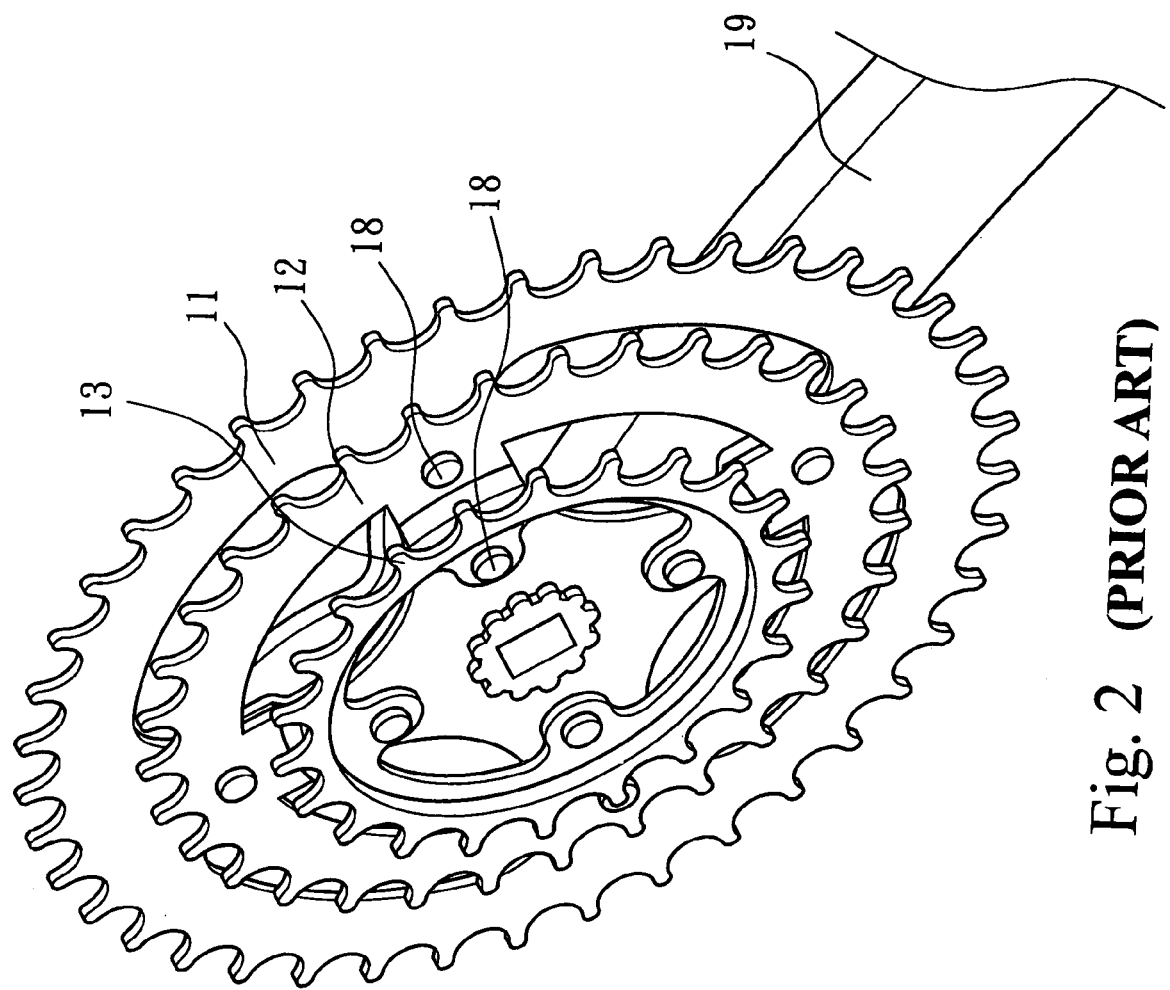
FIG. 2 is an assembled perspective view of the prior art.
Figure 3:
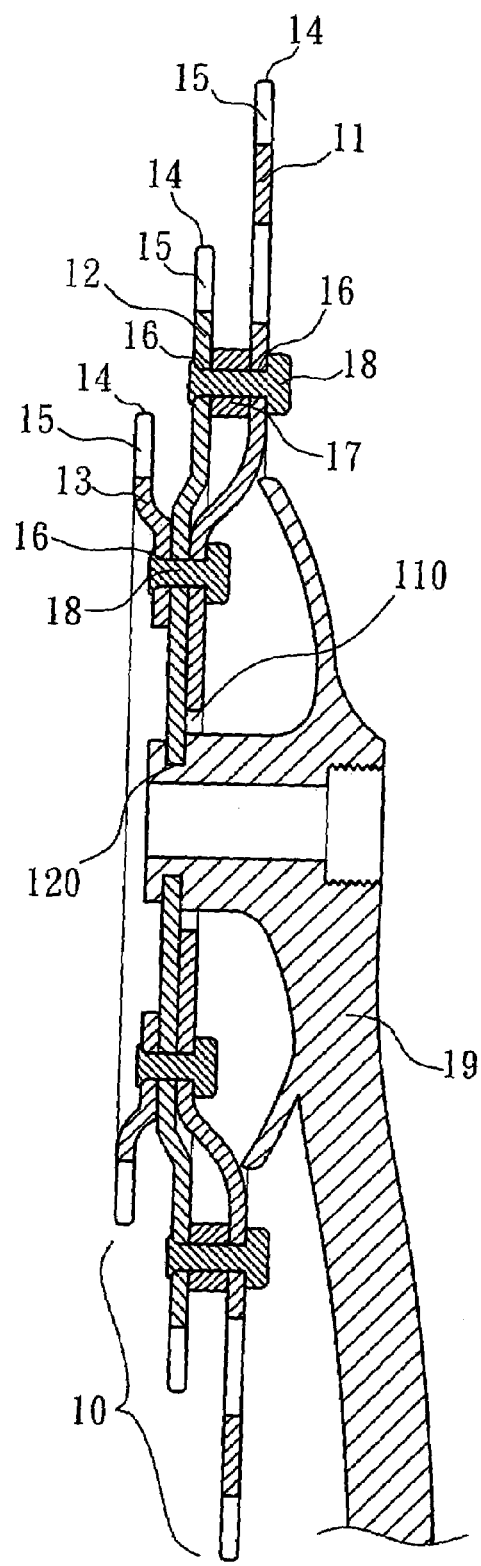
FIG. 3 is an assembled cross section view of the prior art.
Figure 4:
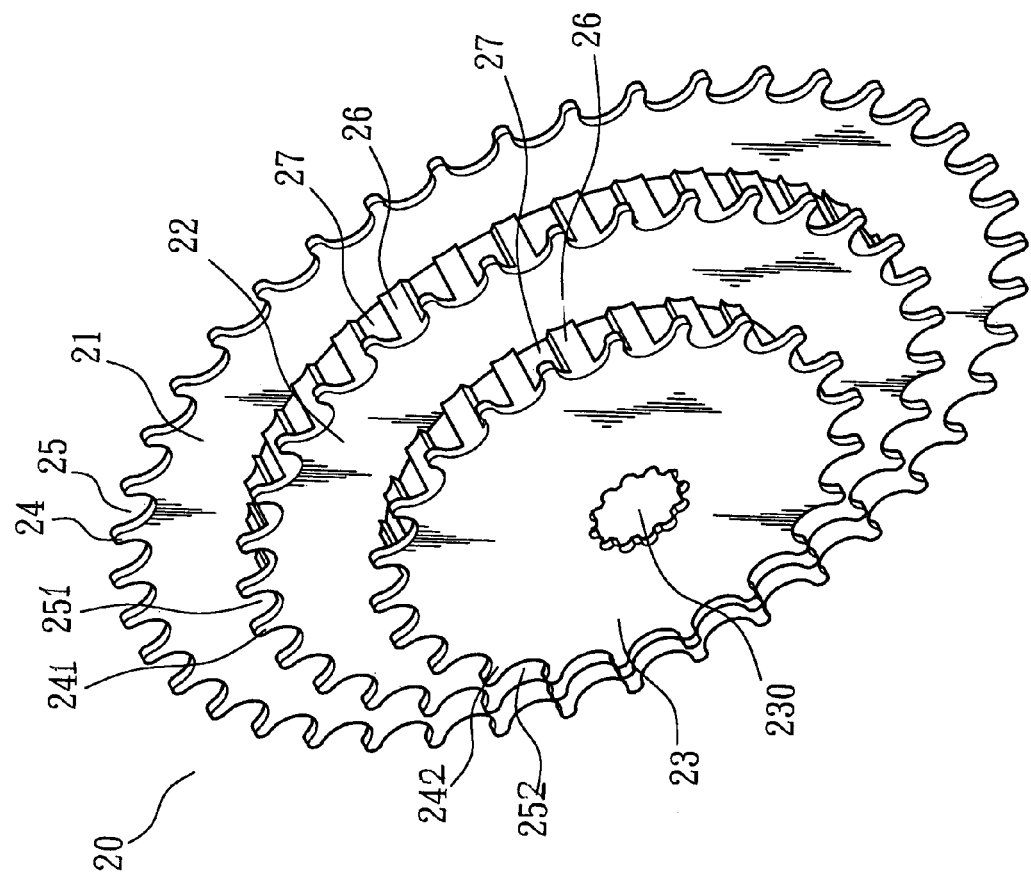
FIG. 4 is a perspective view of the present invention.
Figure 5:
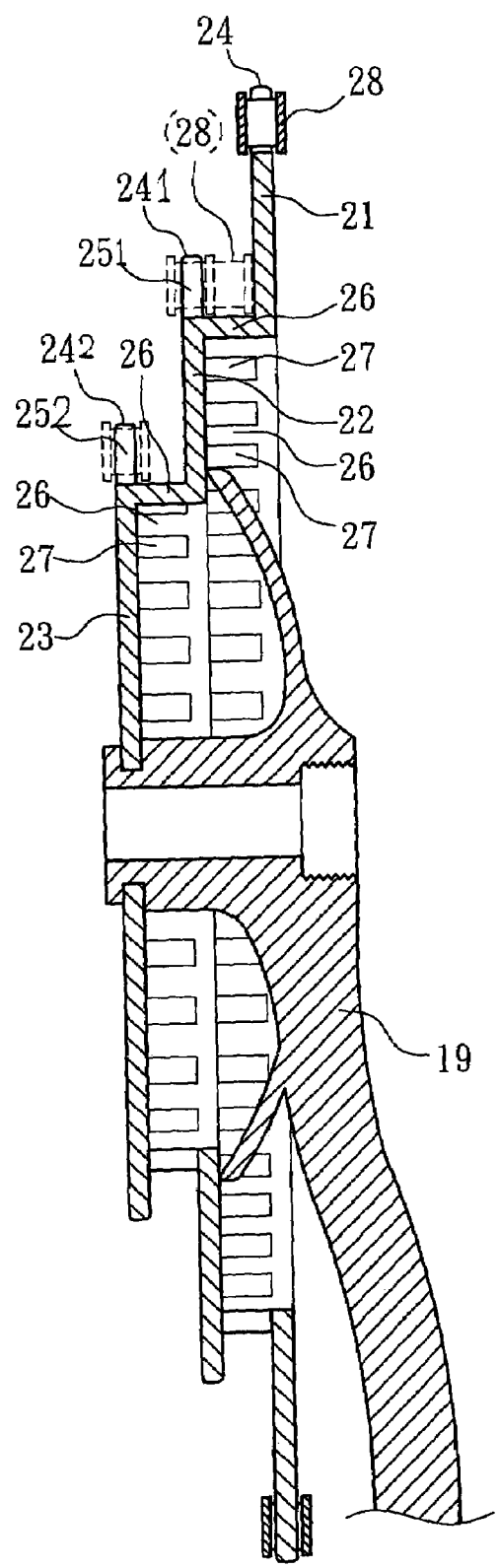
FIG. 5 is a cross section view showing that the present invention is assembled with a treadle and a chain.

With reference to FIGS. 4, and 5, a gear set 20 of the present invention includes a first gear 21, a second gear 22 and a third gear 23. Each of the first gear 21, second gear 22 and third gear 23 is formed with a plurality of teeth 24, 241, 242 and a plurality of recess portions 25, 251, 252. The diameter of the second gear 22 is smaller than that of the first gear 21 and the diameter of the third gear 23 is smaller than that of the second gear 22.

The teeth 24, 241, 242 and recess portions 25, 251, 252 are alternatively arranged. Each gear surface of the second gear 22 and third gear 23 is vertically extended with protruding rings. An outer side of each protruding ring has a plurality of protruding sheets 26 and a plurality of concave portions 27 are formed between the plurality of protruding sheets 26. Each protruding sheet 26 is vertically extended from a respective recess portion 25, 251, 252. The concave portion 27 is between two adjacent two recess portions 25, 251, 252. The third gear 23 has an assembling hole 230 at a center thereof.

The first, second and third gears are formed by a sheet which is firstly formed as a stepped structure containing three layers which are the first gear 21, second gear 22 and third gears 23. The rings between two gears are stripped with a plurality of teeth 24, 241, 242 which are bent to be at the same plane of the second and third gears 22 and 23. The portions of the rings un-stripped are remained as the concave portions 27.

In the present invention, the assembling hole 230 serves to assembly a rod (for example, a pedal rod of a bicycle).

In manufacturing of the present invention, the punching and forging manufacturing process can be used. A sheet is firstly punched (or forged) to has a three layer stepped structure including a first, a second and a third layers. Then, the rings between two gears are formed with a plurality of teeth 24 which are bent to be at the same plane of the second and third gears 22 and 23. Thereby, the three gears 21, 22 and 23 are formed as an integrally structure.

Other than manufacturing by punching and forging, other manufacturing process is allowable. For example, the present invention is made by molding.

In above embodiment, the structure of the present invention has three layers, however, the same structure with layers with numbers other than 3 can be used, such as two or four gears are formed at the structure integrally. Advantages of the present invention will be described herein. Firstly, since the gears 21, 22 and 23 are formed integrally so that the connection is very firmly and thus the structure is strong. It is difficult to deform the gear set of the present invention. Secondly, when a chain 28 is engaged to the gear set 20 of the present invention, since one lateral edge of the chain 28 is in contact with the rings between two gears, some force of the chain is applied to the protruding sheets 26 so that the protruding sheets 26 and the concave portions 27 are uneasy to wear. When the chain 28 is released, it will be hindered by the protruding sheets 26. Thereby, the chain 28 can be taken out easily. Furthermore, the gears 21, 22 and 23 are formed integrally so that it is impossible that any one of the gears 21, 22 and 23 shifts or displaces.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An integrally formed gear set with a plurality of gears comprising a first gear, a second gear and a third gear; each of the first gear, second gear and third gear being formed with a plurality of teeth and a plurality of recess portions; a diameter of the second gear being smaller than that of the first gear and the diameter of the third gear being smaller than that of the second gear; the teeth and recess portions being alternatively arranged; each gear surface of the second gear and third gear being vertically extended with protruding rings; an outer side of each protruding ring having a plurality of protruding sheets which are vertical to a plurality of one of surfaces of the first gear and the second gear; a concave portion is formed between two adjacent protruding sheets; each protruding sheet being vertically extended from a respective recess portion; the concave portion being between two adjacent recess portions; the third gear having an assembling hole at a center thereof for assembling with a rod; and wherein the first, second and third gears are formed integrally.

2. The integrally formed gear set with a plurality of gears as claimed in claim 1, wherein other gear is further protruded from the gear set so that the number of gear is more than three.

* * * * *